US011187306B2

(12) United States Patent
Hrusch et al.

(10) Patent No.: US 11,187,306 B2
(45) Date of Patent: Nov. 30, 2021

(54) TWO-SPEED ACCESSORY DRIVE PULLEY

(71) Applicant: Schaeffler Technologies AG & Co. KG, Herzogenaurach (DE)

(72) Inventors: Nicholas Hrusch, Wooster, OH (US); Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 349 days.

(21) Appl. No.: 16/256,475

(22) Filed: Jan. 24, 2019

(65) Prior Publication Data
US 2019/0301573 A1 Oct. 3, 2019

Related U.S. Application Data

(60) Provisional application No. 62/649,228, filed on Mar. 28, 2018.

(51) Int. Cl.
*F16H 9/26* (2006.01)
*F16H 55/36* (2006.01)
*F02B 67/06* (2006.01)

(52) U.S. Cl.
CPC ............ *F16H 9/26* (2013.01); *F02B 67/06* (2013.01); *F16H 55/36* (2013.01); *F02B 2275/06* (2013.01); *F16H 2200/0034* (2013.01); *F16H 2200/2005* (2013.01); *F16H 2200/2035* (2013.01); *F16H 2200/2066* (2013.01); *F16H 2200/2082* (2013.01)

(58) Field of Classification Search
CPC .... F16H 9/26; F16H 55/36; F16H 2200/2082; F16H 2200/2035; F16H 2200/0034; F16H 2200/2066; F16H 2200/2005; F16H 2063/3066; F16H 2063/3053; F16H 3/54; F02B 67/06; F02B 2275/06
See application file for complete search history.

(56) References Cited

U.S. PATENT DOCUMENTS

| 8,475,317 B2 | 7/2013 | Janson et al. | |
| 10,830,126 B2 * | 11/2020 | Hrusch | F16D 41/04 |
| 2005/0153813 A1 * | 7/2005 | Serkh | B60K 25/00 |
| | | | 475/324 |
| 2021/0207568 A1 * | 7/2021 | Hemphill | F16H 3/46 |

* cited by examiner

*Primary Examiner* — David J Hlavka
(74) *Attorney, Agent, or Firm* — LeKeisha M. Suggs

(57) ABSTRACT

A two-speed pulley assembly for an engine accessory drive includes a planetary gear, a pulley, a friction clutch, and a one-way clutch. The planetary gear has a ring gear, a sun gear, a planet carrier, and a planet gear. The planet gear is rotatable relative to the planet carrier and is drivingly engaged with the ring gear and the sun gear. The pulley circumscribes the ring gear and is in driving engagement with the ring gear. The friction clutch is arranged to selectively prevent rotation of the sun gear. The one-way clutch is arranged between the sun gear and the ring gear to permit rotation of the sun gear relative to the ring gear in a first rotational direction, and prevents rotation in a second rotational direction, opposite the first rotational direction.

20 Claims, 4 Drawing Sheets

TWO-SPEED ACCESSORY DRIVE PULLEY

CROSS-REFERENCE TO RELATED APPLICATIONS

This application claims the benefit of U.S. Provisional Patent Application No. 62/649,228, filed Mar. 28, 2018, the disclosure of which is incorporated in its entirety by reference herein.

TECHNICAL FIELD

The present disclosure relates generally to an accessory drive pulley for an engine, and more specifically to a two-speed accessory drive pulley.

BACKGROUND

Conventionally, motor vehicle accessories are driven directly off the crankshaft pulley. The size of the crankshaft pulley typically determines the speed that the belt and accessories are driven at. In many circumstances, the vehicle accessories are driven faster than necessary so that in high load situations the large electrical and cooling loads can be met, which may result in extra losses.

BRIEF SUMMARY

According to embodiments disclosed herein, a two-speed pulley assembly for an engine accessory drive includes a planetary gear, a pulley, a friction clutch, and a one-way clutch (OWC). The planetary gear has a ring gear rotatable about an axis, a sun gear, a planet carrier, and a planet gear. The planet carrier is arranged for driving engagement with an engine crankshaft. The planet gear is rotatable relative to the planet carrier and is drivingly engaged with the ring gear and the sun gear. The pulley circumscribes the ring gear and is in driving engagement with the ring gear. The friction clutch is arranged to selectively prevent rotation of the sun gear. The one-way clutch is arranged between the sun gear and the ring gear. The one-way clutch permits rotation of the sun gear relative to the ring gear in a first rotational direction, and prevents rotation of the sun gear relative to the ring gear in a second rotational direction, opposite the first rotational direction.

In some embodiments, the OWC locks the sun gear to the ring gear in a first operating condition, wherein the pulley spins at a same speed as the engine crankshaft. The friction clutch engages to prevent rotation of the sun gear in a second operating condition, wherein the pulley spins faster than the engine crankshaft.

In some embodiments, the one-way clutch is a wedge clutch, a roller clutch, or a sprag clutch. The two-speed pulley assembly may include a torsional isolator arranged in a torque path between the ring gear and the pulley. The two-speed pulley assembly may have a first bearing arranged for relative rotation between the sun gear and the planet carrier. In an example embodiment, the two-speed pulley assembly has a second bearing arranged for relative rotation of the ring gear relative to the sun gear.

In some example embodiments, the friction clutch has an output ramp plate, a separator plate, and a clutch plate. The output ramp plate is arranged to be rotationally fixed to an engine block. The separator plate is arranged to be rotationally fixed to the engine block. The clutch plate is disposed axially between the output ramp plate and the separator plate and is drivingly engaged with the sun gear. In an example embodiment, the two-speed pulley assembly has a return spring disposed axially between the output ramp plate and the separator plate configured to urge the output ramp plate axially away from the separator plate.

In some example embodiments, the two-speed pulley assembly has an input ramp plate rotatable relative to the output ramp plate. The input ramp plate has at least one first ramp, the output ramp plate has at least one second ramp, complementary to or mateable with the first ramp, and rotation of the input ramp plate relative to the output ramp plate displaces the output ramp plate axially towards the input ramp plate. In an example embodiment, axial displacement of the output ramp plate clamps the clutch plate between the output ramp plate and the separator plate to prevent rotation of the clutch plate. In an example embodiment, the two-speed pulley assembly has a bearing arranged for relative rotation of the input ramp plate relative to the ring gear.

In some example embodiments, the two-speed pulley assembly has an actuator arranged to rotate the input ramp plate. In some example embodiments, the actuator is arranged to be fixed to the engine block. In an example embodiment, the actuator is a linear actuator with a connecting rod attached to the input ramp plate via a pin connection. In an example embodiment, the actuator is a rotary actuator with a shaft engaged with the input ramp via a worm gear drive.

In some embodiments, a method of operating a two-speed pulley assembly for an engine accessory drive having a pulley circumscribing a ring gear of a planetary gear set is provided. The method includes locking, via a one-way clutch, the ring gear to a sun gear of the planetary gear set in a first operating condition such that the pulley rotates at a same speed as an engine crankshaft. The method also includes engaging a friction clutch to prevent rotation of the sun gear in a second operating condition, wherein the pulley rotates at a faster speed than the engine crankshaft.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure discloses a two-speed accessory drive device that would allow for the option to underdrive vehicle accessories during normal driving conditions, while allowing for the crankshaft pulley to be overdriven to meet any extra accessory demand during high load driving conditions. When high accessory demand is detected by the vehicle, the accessory drive device can be switched into an overdrive mode so that the pulley is driven at an increased speed. When the high load condition is removed, the accessory drive device returns to the original, normal operating speed.

Figure 1:
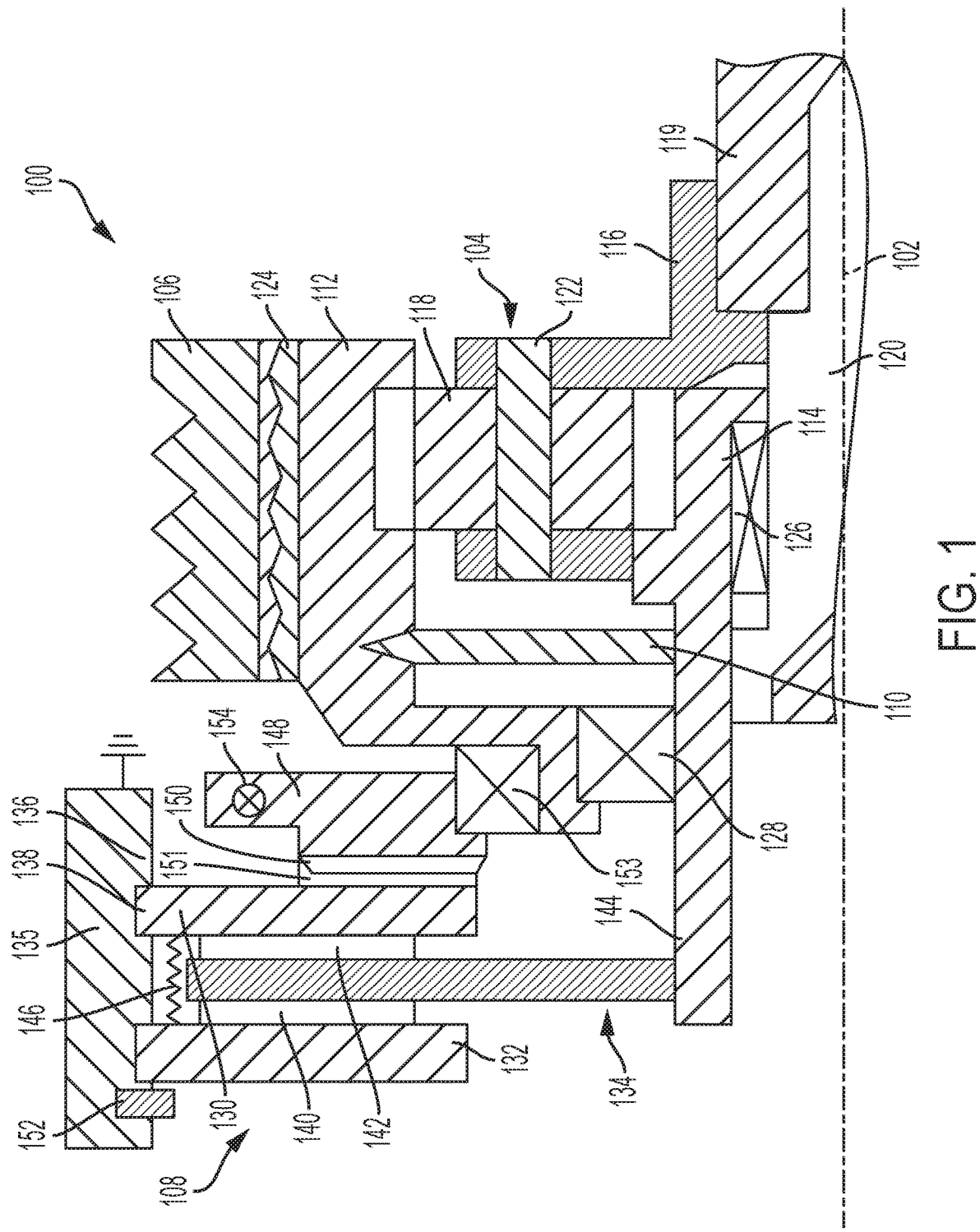
FIG. 1 shows a partial sectional view of a two-speed accessory drive pulley according to one embodiment.

The following description is made with reference to FIG. 1. FIG. 1 shows a partial sectional view of two-speed accessory drive pulley, or two-speed pulley assembly, 100. Two-speed pulley assembly 100 is provided for an engine accessory drive. That is, pulley assembly 100 may be part of an engine accessory drive including an alternator, water pump, power steering pump, air conditioning compressor, or other known engine accessories. Known accessory drives connect the various components rotationally via a belt and pulleys.

Pulley assembly 100 includes axis 102, planetary gear 104, pulley 106, friction clutch 108, and one-way clutch 110. Planetary gear 104 includes ring gear 112 rotatable about the axis 102, sun gear 114, planet carrier 116, and planet gear 118. Planet carrier 116 is arranged for driving engagement with engine crankshaft 119 via bolt 120, for example, and includes planet pin 122. Planet gear 118 is rotatable relative to the planet carrier 116 about the planetary pin 122 drivingly engaged with the ring gear 112 and the sun gear 114. That is, the ring gear 112, sun gear 114, and planet gear 118 each have mating teeth so that they rotate together about their respective axes.

Pulley 106 circumscribes the ring gear 112 and is in driving engagement with the ring gear 112. In the example embodiment shown in FIG. 1, torsional isolator 124 is arranged in a torque path between the ring gear 112 and the pulley 106, although other arrangements are possible. Torsional isolator 124 may be an elastomer such as rubber or a polymer, for example. Other embodiments (not shown) may include the pulley 106 fixed directly to the ring gear 112 or formed integrally with the ring gear 112.

Friction clutch 108 is arranged to selectively prevent rotation of the sun gear 114 as described in more detail below. One-way clutch 110 is arranged between the sun gear 114 and the ring gear 112. The one-way clutch 110 permits rotation of the sun gear 114 relative to the ring gear 112 in a first rotational direction and prevents rotation of the sun gear 114 relative to the ring gear 112 in a second rotational direction, opposite the first rotational direction. In the example embodiment shown in FIG. 1, one-way clutch 110 is a wedge clutch. Although one-way clutch 110 is shown as a wedge clutch, other embodiments are possible. For example, one-way clutch 110 may be a roller clutch or a sprag clutch, as is known in the art.

Bearing 126 is arranged for relative rotation between the sun gear 114 and the planet carrier 116. Bearing 128 is arranged for relative rotation of the ring gear 112 relative to the sun gear 114. Friction clutch 108 includes output ramp plate 130, separator plate 132, and clutch plate 134. The output ramp plate 130 is arranged to be rotationally fixed to an engine block. For example, the engine block or a component fixed thereto (e.g. carrier 135) may comprise spline 136 and ramp plate 130 includes mating spline 138 engaged with spline 136, preventing rotation of ramp plate 130. Similarly, the separator plate 132 is arranged to be rotationally fixed to the engine block in a similar manner as ramp plate 130 described above. That is, separator plate 132 includes a splined connection with carrier 135. Clutch plate 134 is disposed axially between the output ramp plate 130 and the separator plate 132 and drivingly engaged with the sun gear 114. In the embodiment shown in FIG. 1, clutch plate 134 includes friction material 140 on a first axial side between separator plate 132 and clutch plate 134 and friction material 142 on a second axial side between clutch plate 134 and output ramp plate 130. Clutch plate 134 is drivingly engaged with the sun gear 114 at mating spline 144. Return spring 146 is disposed axially between the output ramp plate 130 and the separator plate 132. Spring 146, or another resilient element, urges the output ramp plate 130 axially away from the separator plate 132.

Pulley assembly 100 also includes input ramp plate 148 rotatable relative to output ramp plate 130. The input ramp plate 148 includes ramp 150 and the output ramp plate 130 includes ramp 151, complementary to the first ramp. Although ramps 150 and 151 are depicted in direct contact, other embodiments are possible. For example, a ball or other rotatable element may be included axially between ramps 150 and 151 for reduced friction. Rotation of input ramp plate 148 relative to output ramp plate 130 displaces the output ramp plate 130 axially towards the input ramp plate 148. Snap ring 152 limits axial displacement of the separator plate 132. Axial displacement of the output ramp plate 130 clamps the clutch plate 134 between the output ramp plate 130 and the separator plate 132 to prevent rotation of the clutch plate 134. That is, since the output ramp plate 130 and the separator plate 132 are rotationally fixed to the engine block as described above, clamping the clutch plate 134 also fixes the clutch plate 134 to the engine block, thereby preventing rotation of the clutch plate 134. The clutch plate 134 is connected to the sun gear 114 so that clamping of the clutch plate 134 prevents rotation of the sun gear 114. Bearing 153 is arranged for relative rotation of the input ramp plate 148 relative to the ring gear 112.

Figure 2:
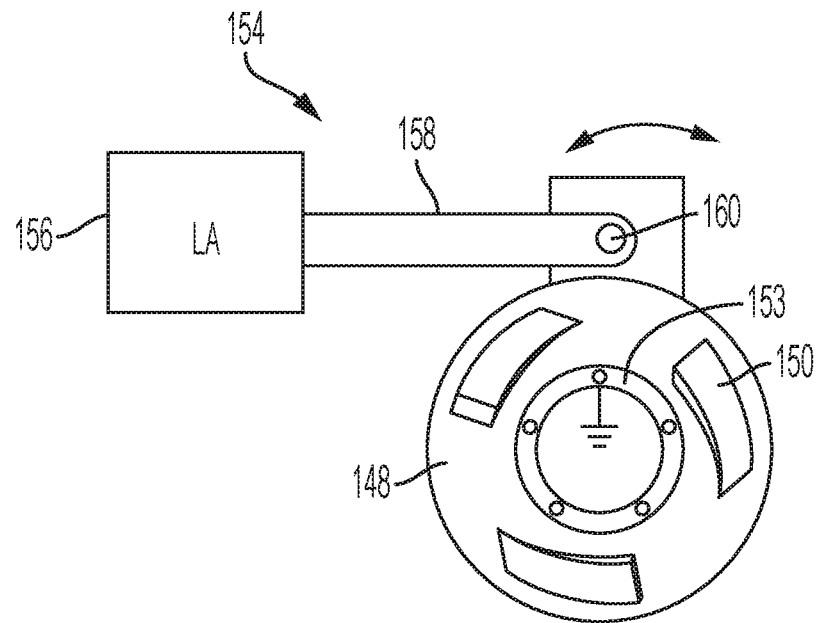
FIG. 2 shows a front view of an actuator for the two-speed accessory drive pulley of FIG. 1 according to one embodiment.
Figure 3:
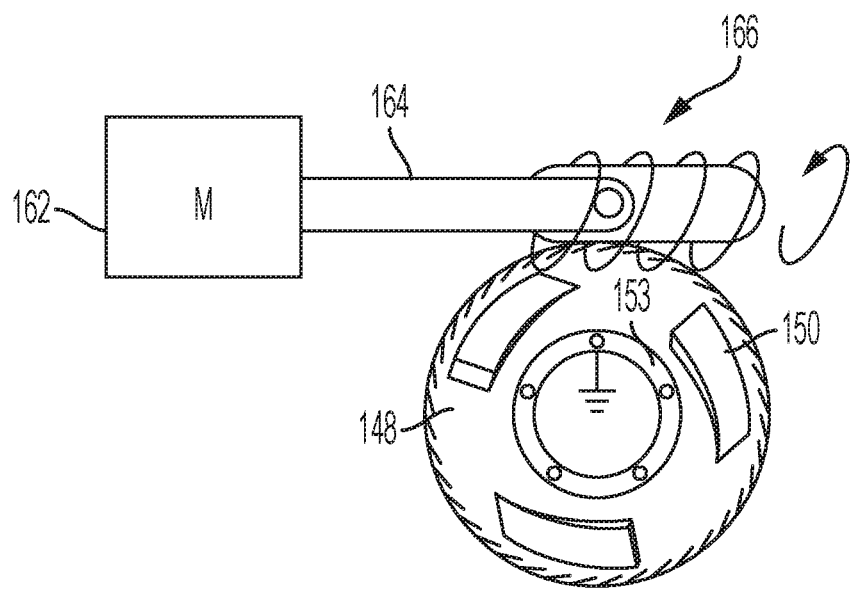
FIG. 3 shows a front view of an actuator for the two-speed accessory drive pulley of FIG. 1 according to an alternative embodiment.

The following description is made with reference to FIGS. 2-3. FIG. 2 shows a front view of an example actuator for the two-speed accessory drive pulley of FIG. 1. FIG. 3 illustrates a front view of an alternative embodiment of an actuator for the two-speed accessory drive pulley of FIG. 1. Pulley assembly 100 may include actuator 154 arranged to rotate the input ramp plate 148. Actuator 154 is arranged to be fixed to the engine block (not shown). As shown in FIG. 2, actuator 154 may be linear actuator 156 with connecting rod 158 attached to the input ramp plate 148 via pin connection 160. As shown in FIG. 3, actuator 154 may be a rotary actuator 162 with shaft 164 engaged with input ramp plate 148 via worm gear drive 166. In another embodiment (not shown), a brushless motor may be installed around a periphery of the output ramp plate for direct rotation.

Figure 4:
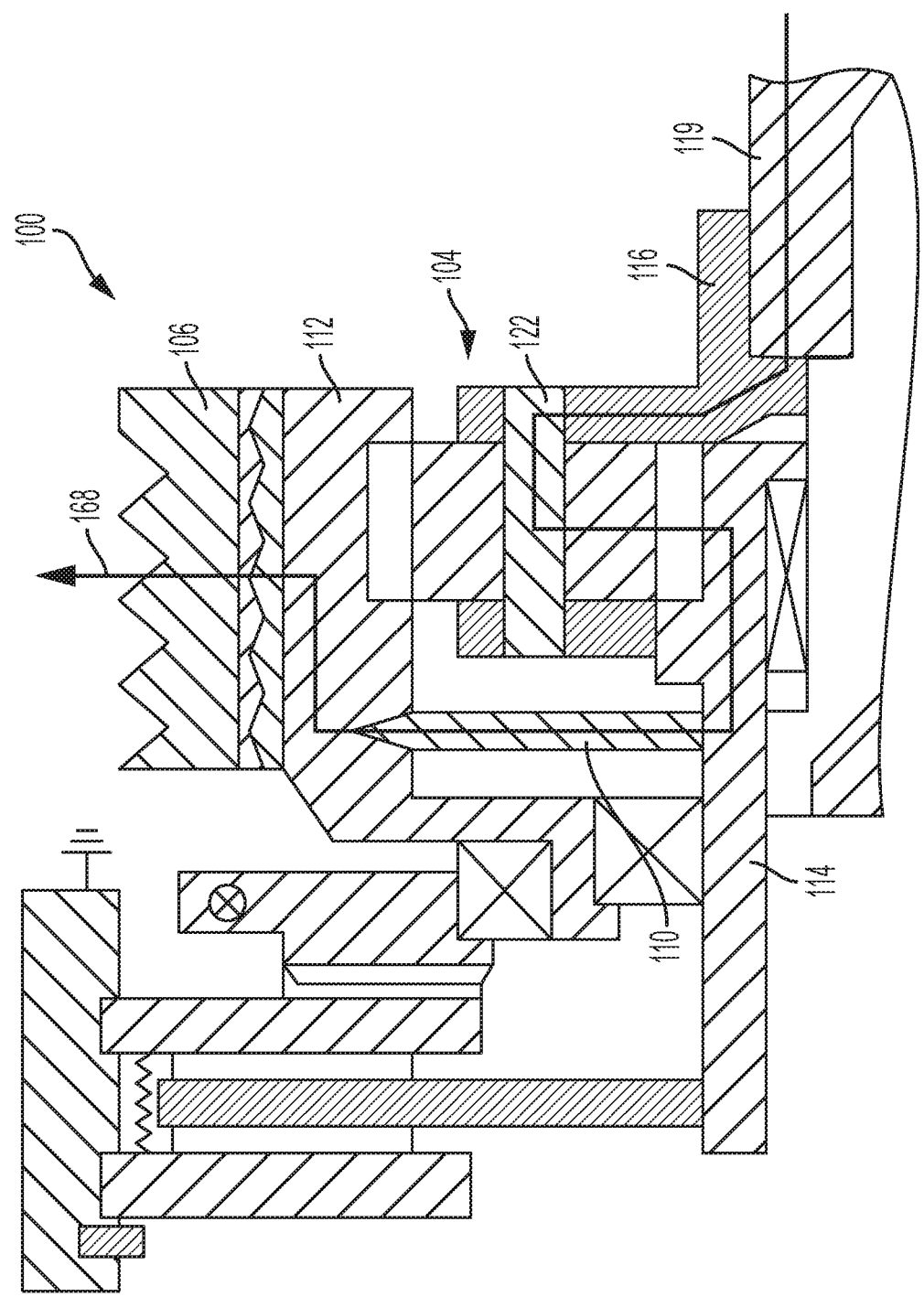
FIG. 4 shows a first torque path through the two-speed accessory drive pulley of FIG. 1 according to one vehicle operating condition.
Figure 5:
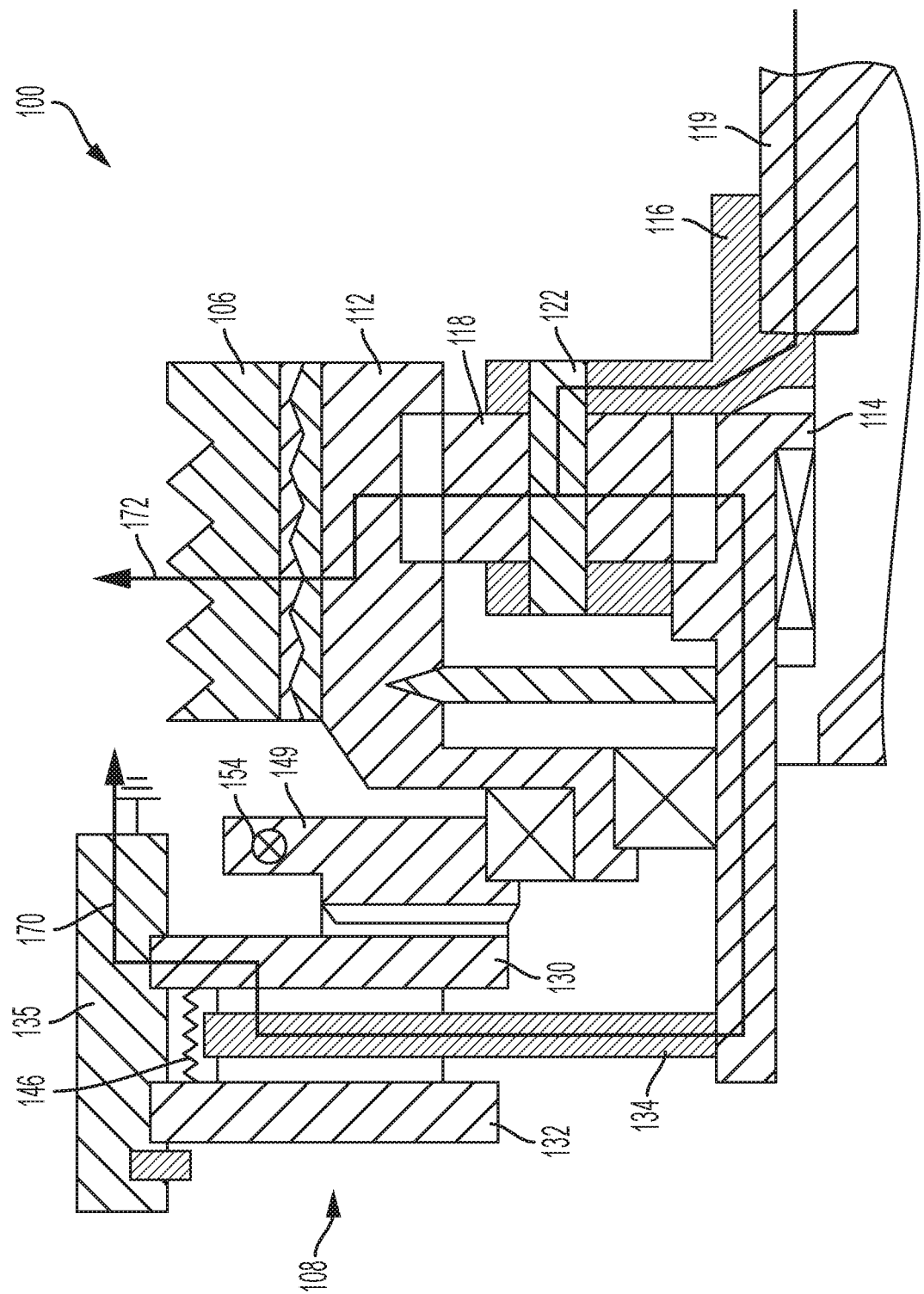
FIG. 5 shows a second torque path through the two-speed accessory drive pulley of FIG. 1 according to a second vehicle operation condition.

The following description is made with reference to FIGS. 4-5. FIG. 4 shows a first torque path through the two-speed accessory drive pulley of FIG. 1 during normal operation. FIG. 5 shows a second torque path through the two-speed accessory drive pulley of FIG. 1 during overspeed operation (or overdrive mode for high load situations). As shown by arrow 168 in FIG. 4, during normal operation, torque from the crankshaft 119 enters the carrier 116 and planet pin 122 before passing through the sun gear 114, one-way clutch 110, and ring gear 112 and exits through the pulley 106. The one-way clutch 110 locks the sun gear 114 and ring gear 112 together so that the entire planetary gear 104 spins as one unit and the pulley rotates at the same speed as the crankshaft 119.

During overspeed operation or overdrive mode, and as shown by arrow 170 in FIG. 5, torque from the crankshaft 119 necessary to ground the sun gear 114 enters the planet carrier 116 and planet pin 122 before passing through the sun gear 114, into the clutch plate 134, and into carrier 135. Actuator 154 rotates the input ramp plate 148 in a first direction to engage the clutch 108 and the sun gear 114 is prevented from rotating.

As shown by Arrow 172, the remaining torque entering from crankshaft 119 passes from planet carrier 116 into the ring gear 112 and out into the pulley 106. Specifically, rotation of the planetary carrier 116 rotates the planet gears 118 and, because the sun gear 114 is rotationally fixed, torque in the planet gear 118 reacts against the sun gear 114 and passes through the ring gear 112 to the pulley 106, resulting in an overspeed ratio between the pulley 106 and the crankshaft 119. That is, the pulley 106 spins faster than the crankshaft 119 when the clutch 108 is engaged. The one-way clutch 110 freewheels because the ring gear 112 is rotating faster than the sun gear 114. When normal operation is desired, the actuator 154 rotates the input ramp plate 148 in a second direction opposite the first direction of rotation and the spring 146 pushes the output ramp plate 130 away from the separator plate 132 to open the clutch 108, allowing rotation of the sun gear 114.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMERALS

100 Two-speed accessory drive pulley
102 Axis
104 Planetary gear
106 Pulley
108 Friction clutch
110 One-way clutch
112 Ring gear
114 Sun gear
116 Planet carrier
118 Planet gear
119 Engine crankshaft
120 Bolt
122 Planet pin
124 Torsional isolator
126 Bearing
128 Bearing
130 Output ramp plate
132 Separator plate
134 Clutch plate
135 Carrier
136 Spline
138 Spline
140 Friction material
142 Friction material
144 Spline
146 Spring
148 Input ramp plate
150 Ramp
151 Ramp
152 Snap ring
153 Bearing
154 Actuator
156 Linear actuator
158 Connecting rod
160 Pin connection
162 Rotary actuator
164 Shaft
166 Worm gear drive
168 Torque in normal operation
170 Reaction torque in overspeed operation
172 Output torque in overspeed operation

What is claimed is:

1. A two-speed pulley assembly for an engine accessory drive comprising:
    a planetary gear comprising:
        a ring gear rotatable about an axis;
        a sun gear;
        a planet carrier arranged for driving engagement with an engine crankshaft; and
        a planet gear rotatable relative to the planet carrier and drivingly engaged with the ring gear and the sun gear;
    a pulley circumscribing the ring gear and in driving engagement with the ring gear;
    a friction clutch arranged to selectively prevent rotation of the sun gear; and
    a one-way clutch (OWC) arranged between the sun gear and the ring gear, the OWC being configured to:
        permit rotation of the sun gear relative to the ring gear in a first rotational direction; and
        prevent rotation of the sun gear relative to the ring gear in a second rotational direction, opposite the first rotational direction.

2. The two-speed pulley assembly of claim 1, wherein:
    the OWC locks the sun gear to the ring gear in a first operating condition, wherein the pulley spins at a same speed as the engine crankshaft; and
    the friction clutch engages to prevent rotation of the sun gear in a second operating condition, wherein the pulley spins faster than the engine crankshaft.

3. The two-speed pulley assembly of claim 1, further comprising a torsional isolator arranged in a torque path between the ring gear and the pulley.

4. The two-speed pulley assembly of claim 1, wherein the OWC is a wedge clutch, a roller clutch, or a sprag clutch.

5. The two-speed pulley assembly of claim 1, further comprising a first bearing arranged for relative rotation between the sun gear and the planet carrier.

6. The two-speed pulley assembly of claim 5, further comprising a second bearing arranged for relative rotation of the ring gear relative to the sun gear.

7. The two-speed pulley assembly of claim 1, wherein the friction clutch comprises:
   an output ramp plate arranged to be rotationally fixed to an engine block;
   a separator plate arranged to be rotationally fixed to the engine block; and
   a clutch plate disposed axially between the output ramp plate and the separator plate and drivingly engaged with the sun gear.

8. The two-speed pulley assembly of claim 7, further comprising a return spring disposed axially between the output ramp plate and the separator plate, wherein the return spring is configured to urge the output ramp plate axially away from the separator plate.

9. The two-speed pulley assembly of claim 7, wherein axial displacement of the output ramp plate clamps the clutch plate between the output ramp plate and the separator plate to prevent rotation of the clutch plate.

10. The two-speed pulley assembly of claim 7, further comprising an input ramp plate rotatable relative to the output ramp plate, wherein:
    the input ramp plate comprises at least one first ramp;
    the output ramp plate comprises at least one second ramp mateable with the first ramp; and
    rotation of the input ramp plate relative to the output ramp plate displaces the output ramp plate axially towards the input ramp plate.

11. The two-speed pulley assembly of claim 10, further comprising a bearing arranged for relative rotation of the input ramp plate relative to the ring gear.

12. A two-speed pulley assembly for an engine accessory drive comprising:
    a planetary gear comprising a ring gear, a sun gear, a planet carrier arranged for driving engagement with an engine crankshaft, and a planet gear rotatable relative to the planet carrier and drivingly engaged with the ring gear and the sun gear;
    a pulley circumscribing the ring gear and in driving engagement with the ring gear;
    a one-way clutch (OWC) arranged between the sun gear and the ring gear, the OWC being configured to connect the sun gear to the ring gear in a first operating condition, wherein the pulley rotates at a same speed as the engine crankshaft; and
    a friction clutch configured to prevent rotation of the sun gear in a second operating condition, wherein the pulley rotates at a faster speed than the engine crankshaft.

13. The two-speed pulley assembly of claim 12, wherein the friction clutch includes a clutch plate drivingly engaged with the sun gear and disposed axially between an output ramp plate and a separator plate.

14. The two-speed pulley assembly of claim 13, further comprising an input ramp plate rotatable relative to the output ramp plate, wherein:
    rotation of the input ramp plate relative to the output ramp plate displaces the output ramp plate axially towards the input ramp plate; and
    the clutch plate is clamped between the output ramp plate and the separator plate to prevent rotation of the clutch plate and the sun gear.

15. The two-speed pulley assembly of claim 14, further comprising an actuator arranged to rotate the input ramp plate.

16. The two-speed pulley assembly of claim 15, wherein the actuator is a linear actuator comprising a connecting rod attached to the input ramp plate via a pin connection.

17. The two-speed pulley assembly of claim 15, wherein the actuator is a rotary actuator comprising a shaft engaged with the input ramp plate via a worm gear drive.

18. A method of operating a two-speed pulley assembly for an engine accessory drive having a pulley circumscribing a ring gear of a planetary gear set, the method comprising:
    locking, via a one-way clutch, the ring gear to a sun gear of the planetary gear set in a first operating condition such that the pulley rotates at a same speed as an engine crankshaft; and
    engaging a friction clutch to prevent rotation of the sun gear in a second operating condition, wherein the pulley rotates at a faster speed than the engine crankshaft.

19. The method of claim 18, wherein the friction clutch comprises:
    an output ramp plate arranged to be rotationally fixed to an engine block;
    a separator plate arranged to be rotationally fixed to the engine block; and
    a clutch plate disposed axially between the output ramp plate and the separator plate and drivingly engaged with the sun gear.

20. The method of claim 19, further comprising an input ramp plate rotatable relative to the output ramp plate, wherein:
    rotation of the input ramp plate relative to the output ramp plate displaces the output ramp plate axially towards the input ramp plate; and
    axial displacement of the output ramp plate clamps the clutch plate between the output ramp plate and the separator plate to prevent rotation of the clutch plate.

* * * * *